United States Patent [19]

Takeshita et al.

[11] Patent Number: 4,457,143
[45] Date of Patent: Jul. 3, 1984

[54] ABSORPTION TYPE HEAT PUMP DEVICE

[75] Inventors: Isao Takeshita, Neyagawa; Yoshiaki Yamamoto, Katano; Hiroyoshi Tanaka, Kyoto, all of Japan

[73] Assignee: Matsushita Electric Industrial Co., Ltd., Kadoma, Japan

[21] Appl. No.: 482,312

[22] Filed: Apr. 1, 1983

[30] Foreign Application Priority Data

Apr. 8, 1982 [JP] Japan ................................ 57-58823

[51] Int. Cl.³ ............................................. F25B 15/00
[52] U.S. Cl. ......................................... 62/476; 62/487
[58] Field of Search .................. 62/107, 487, 489, 476

[56] References Cited

U.S. PATENT DOCUMENTS 3,279,204 10/1966 Palmatier ........................ 62/487 X
3,461,684 8/1969 Simpson ............................ 62/476
3,473,347 10/1969 Andrews et al. ................. 62/487 X Primary Examiner—Lloyd L. King
Attorney, Agent, or Firm—Wenderoth, Lind & Ponack

[57] ABSTRACT

An absorption type heat pump device including a generator for generating refrigerant vapor, a condenser, an evaporator, an expansion valve, an absorber, a solution pump, a passage member for leading strong solution from the generator to the absorber, and a heat exchanger. The heat exchanger and/or the passage member is provided with a portion in which a pressure drop is made larger than a drop in equilibrium pressure resulting from a temperature drop so as to perform flow control of the strong solution.

8 Claims, 6 Drawing Figures

ABSORPTION TYPE HEAT PUMP DEVICE

BACKGROUND OF THE INVENTION

The present invention generally relates to heat pump devices and more particularly, to an absorption type heat pump device.

Since energy consumed for air conditioning occupies a large portion of energy consumed by domestic and industrial appliances, there is a keen demand for development of technology for energy-saving air conditioning. Meanwhile, in response to diversification of energy sources, technology in which air conditioning is performed through direct utilization of heat energy without using electric power has been extensively studied. In this connection, absorption type heat pump devices have such advantages as silent operation, high reliability, long service life, etc. and therefore, attract wide attention.

An arrangement of a prior art absorption type heat pump device is shown in FIG. 1. The known absorption type heat pump device includes a generator 4, a condenser 6, an evaporator 8, and an absorber 1 which are connected in series to each other so as to form one cycle. Since there is a large difference in pressure between the generator 4 and the absorber 1 and weak solution having a large content of refrigerant is required to be fed from the absorber 1 at a lower pressure side to the generator 4 at a higher pressure side, a solution pump 2 is provided therebetween so as to feed a predetermined amount of the weak solution to the generator 4 at all times. In the generator 4, the weak solution is heated so as to emit refrigerant vapor therefrom such that strong solution having a reduced amount of the refrigerant is produced. The strong solution is returned to the absorber 1 through a pressure reducing valve 5 or a capillary. Meanwhile, the strong solution is heated to a high temperature, while the weak solution fed from the absorber 1 to the generator 4 is of a low temperature. Accordingly, a heat exchanger 3 is provided between the absorber 1 and the generator 4 such that sensible heat of the strong solution is transmitted to the weak solution.

More specifically, in the absorber 1, the strong solution returned from the generator 4 absorbs the refrigerant vapor carried from the evaporator 8 so as to be converted into the weak solution having a large content of the refrigerant. Heat produced at the time of the above described absorption is discarded or utilized as a heat source. The weak solution is pressurized by the solution pump 2 and then, heated by the heat exchanger 3 so as to be transported to the generator 4. In the generator 4, the refrigerant contained in the weak solution is generated in the state of vapor through external heating of the weak solution such that the weak solution is converted into the strong solution having a low content of the refrigerant. The strong solution is subjected to heat exchange with the weak solution at the heat exchanger 3 so as to be cooled, and then, reduced in pressure at the pressure reducing valve 5 so as to be returned to the absorber 1.

In the above described one cycle of the prior art absorption type heat pump device, the generator 4 is arranged to separate the refrigerant vapor produced therein and the strong solution having a low content of the refrigerant so as to discharge the refrigerant vapor and the strong solution to the condenser 6 and the absorber 1, respectively.

It is to be noted here that an inflow amount of the weak solution fed into the generator 4 is required to balance with an outflow amount of the refrigerant vapor and the strong solution, both discharged from the generator 4. Especially, in the case where the inflow amount of the weak solution exceeds the outflow amount of the refrigerant vapor and the strong solution, a whole space in the generator 4 is filled with the solution and finally, the strong solution is caused to flow into the condenser 6, thus seriously aggravating functions of the heat pump device. However, since an outflow amount of the strong solution discharged from the generator 4 has a complemental relation with an amount of the refrigerant vapor produced in the generator 4 with respect to a predetermined inflow amount of the weak solution flowing into the generator 4, the outflow amount of the strong solution varies with heating temperatures of the of the solution pump 2 cannot be maintained at a predetermined value. Accordingly, it becomes necessary to control the outflow amount of the strong solution such that the amount of the solution stored in the generator 4 is maintained at a predetermined value.

Especially, in the case where fluorohydrocarbon is used as the refrigerant, latent heat for evaporation of the refrigerant is small, so that the circulation amount of the solution becomes large and thus, the amount of the solution stored in the generator 4 varies considerably in response to even slight imbalance between the inflow amount of the weak solution and the outflow amount of the strong solution and the refrigerant vapor, thereby incurring a strong possibility that the solution flows into the condenser 6. Meanwhile, conventionally there have been employed large-sized generators of a type containing the solution to their full capacities. However, in the case where generators of a type in which the solution is caused to flow therethrough for improvement of the starting characteristics and making their sizes compact, the generator is reduced in volume, thus further increasing the above described possibility that the solution flows into the condenser 6.

Generally, in order to prevent the solution from flowing into the condenser 6, it has been so arranged that the solution in the generator 4 is maintained at a predetermined level. Firstly, a method of adjusting an opening of the pressure reducing valve 5 can be used for the level control of the solution. Namely, in the case where the level of the solution rises, the opening of the pressure reducing valve 5 is enlarged so as to increase the outflow amount of the strong solution. On the contrary, in the case where the level of the solution is lowered, the opening of the pressure reducing valve 5 is decreased so as to reduce the outflow amount of the strong solution.

Referring now to FIG. 2, there is shown a flow control device for the strong solution, employed in a known absorption type heat pump device. The known flow control device includes a float type level sensor 13 attached to the generator 4 such that the outflow amount of the strong solution is increased beyond a normal amount in the case where the solution exceeds a predetermined level. The weak solution flows into the generator 4 through a pipe 9 and then, is heated thereat by a heat source 10 such that the refrigerant vapor is generated from the weak solution. Subsequently, the refrigerant vapor is transported to the condenser 6 through a pipe 11. On the other hand, the strong solution is carried to the pressure reducing valve 5 through the heat exchanger 3 and then, discharged therefrom to the absorber 1 through a pipe 12. The float type level sensor 13 is arranged to detect the level of the solution such that the detection signals are converted into electrical signals and the like so as to adjust the opening of the pressure reducing valve 5. However, since the above described known flow control device includes a number of mechanical movable parts such as the float floating and sinking in the solution, the opening of the pressure reducing valve 5, thereby resulting in frequent malfunctions of the flow control device and higher production cost thereof.

Referring now to FIG. 3, there is shown another flow control device for the strong solution, employed in a prior art absorption type heat pump device. The prior art flow control device includes a suction pipe 21 for the generator 4 and having an inlet portion 21a formed with a plurality of pores such that an amount of the refrigerant vapor sucked into the inlet portion 21a varies according to levels of the solution in the generator 4. In the prior art flow control device, a fixed capillary 22 is used as the pressure reducing valve 5 in FIG. 1 such that dimensions of the capillary 22 is so selected as to correspond to a maximum permissible low resistance value. It should be noted that the maximum permissible flow resistance value means a flow resistance value assumbed by the capillary 22 at the time when the solution is maintained at a predetermined level without inflow of the refrigerant vapor into the suction pipe 21 even in the case where a difference in concentration between the weak solution and the strong solution becomes minimal due to temperature conditions, etc. with the result that the outflow amount of the strong solution to be returned to the absorber 1 is required to be increased or in the case where it becomes difficult to convey the strong solution from the generator 4 to the absorber 1 as a difference in pressure therebetween becomes small.

By the above described arrangement of the prior art flow control device of FIG. 3, in the case where the outflow amount of the strong solution is small or in the case where the strong solution is transported from the generator 4 to the absorber 1 smoothly due to increase of a difference in pressure therebetween, the level of the solution is lowered accordingly, so that the strong solution is caused to flow out of the generator 4, with the refrigerant vapor being mixed with the strong solution and thus, pressure loss of the strong solution becomes large, whereby the outflow amount of the strong solution is automatically controlled such that the solution is maintained substantially at the predetermined level.

Although the solution in the generator 4 can be easily and effectively maintained at the predetermined level by the prior art flow control device of FIG. 3, the prior art flow control device of FIG. 3 has such an inconvenience that, since an inside of the suction pipe 21 is subjected to supercooling at all times, the refrigerant vapor mixed with the strong solution is rapidly absorbed by the strong solution, so that a rather large amount of the refrigerant vapor is required to be mixed with the strong solution so as to sufficiently increase the pressure drop of the strong solution in the suction pipe 21 in the case where the outflow amount of the strong solution is small and thus, a large amount of the refrigerant vapor to be fed to the condenser 6 is required to be uselessly returned to the absorber 1, thereby resulting in a large reduction of an output of the heat pump device.

SUMMARY OF THE INVENTION

Accordingly, an essential object of the present invention is to provide an improved absorption type heat pump device which can positively perform flow control of strong solution and is substantially free from malfunctions, with substantial elimination of the disadvantages inherent in conventional absorption type heat pump devices of this kind.

Another important object of the present invention is to provide an improved absorption type heat pump device which is simple in structure, highly reliable in actual use and suitable for mass production at low cost.

In accomplishing these and other objects according to one preferred embodiment of the present invention, there is provided an improved absorption type heat pump device comprising: a generator for generating refrigerant vapor from weak solution having a large amount of the refrigerant dissolved therein by heating the weak solution such that the weak solution is converted into strong solution having a reduced content of the refrigerant; a condenser for liquefying the refrigerant vapor through cooling thereof; an evaporator for evaporating the liquefied refrigerant through absorption of heat thereinto; and expansion valve for maintaining a difference in pressure between said condenser and said evaporator at a predetermined value; an absorber for absorbing the refrigerant vapor thereinto such that the weak solution is produced, with pressure in said absorber being maintained at a predetermined low evaporation pressure; a solution pump for feeding the weak solution to said generator through pressurizing of the weak solution; a passage member for leading the strong solution from said generator to said absorber; and a heat exchanger for performing heat exchange between the strong solution and the weak solution fed from said absorber to said generator by said solution pump, which is provided on said passage member so as to be interposed between said generator and said absorber; said heat exchanger and/or said passage member between said generator and said heat exchanger being provided with a portion in which a pressure drop is made larger than a drop in equilibrium pressure resulting from a temperature drop, whereby flow of the strong solution from said generator to said absorber is controlled through ultilization of the refrigerant vapor produced due to the pressure drop in said portion.

In accordance with the present invention, the flow control of the strong solution can be positively performed by the absorption type heat pump device having a simplified construction, thereby resulting in substantial elimination of malfunctions thereof.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 4A:
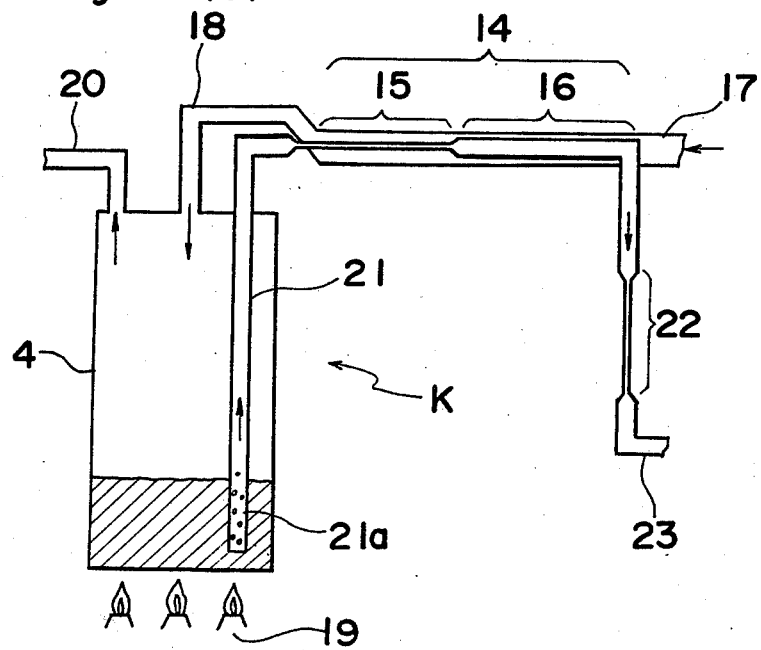
FIG. 4(a) is a schematic view showing an arrangement of a flow control device for strong solution, employed in an absorption type heat pump device according to one preferred embodiment of the present invention.
Figure 4B:
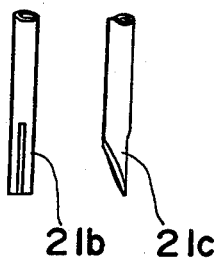
FIG. 4(b) is schematic views of inlet portions of a suction pipe for the strong solution, which suction pipe can be employed in the flow control device of FIG. 4(a)

Referring now to the drawings, there is shown in FIGS. 4(a) and 4(B), an arrangement of a flow control device K for strong solution, employed in an absorption type heat pump device according to one preferred embodiment of the present invention.

Figure 1:
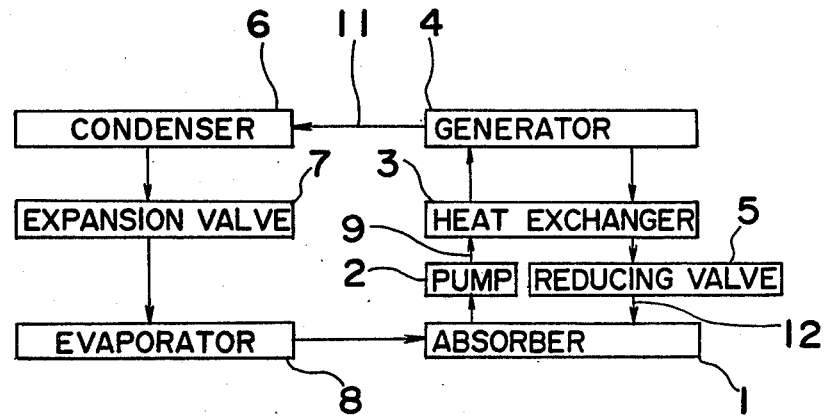
FIG. 1 is a block diagram explanatory of an arrangement of a prior art absorption type heat pump device (already referred to)
Figure 2:
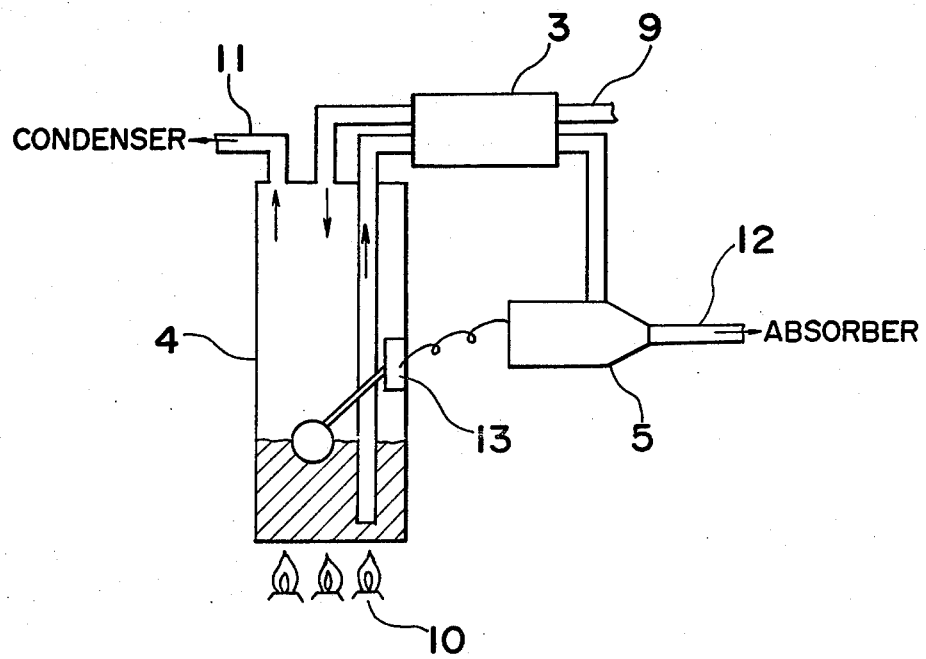
FIG. 2 is a schematic view showing an arrangement of a flow control device for strong solution, employed in the prior art absorption type heat pump device of FIG. 1 (already referred to)
Figure 3:
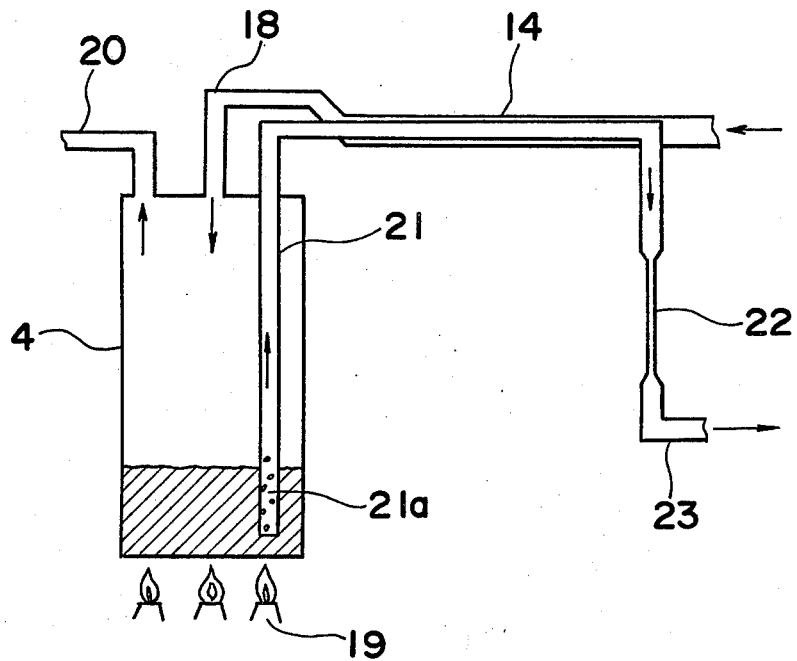
FIG. 3 is a view similar to FIG. 2, particularly showing an arrangement of another prior art flow control device for strong solution (already referred to)

It is to be noted here that the absorption type heat pump device of the present invention includes an absorber 1, a solution pump 2, a generator 4, a condenser 6, an expansion valve 7 and an evaporator 8 in the same manner as shown in FIG. 1 illustrating a known absorption type heat pump device.

The flow control device K includes a heat exchanger 14, pipes 17, 18, 20 and 23, a heat source 19 and a suction pipe 21 having an inlet portion 12a formed with a plurality of pores. The heat exchanger 14 is of a double pipe construction including an outer pipe and an inner pipe. The heat exchanger 14 is constituted by a capillary portion 15 and a large diameter portion 16, with the inner pipe of the large diameter portion 16 being larger in diameter than that of the capillary portion 15. Weak solution having a large amount of refrigerant dissolved therein is fed, through the pipe 17, to the heat exchanger 14 so as to be heated thereat and then, transported to the generator 4 through the pipe 18. Thereafter, the weak solution is heated by a heat source 19 at the generator 4 such that refrigerant vapor is generated from the weak solution, whereby the weak solution is converted into strong solution having a reduced content of the refrigerant. Subsequently, the refrigerant vapor produced at the generator 4 is discharged to the condenser 6 through the pipe 20. On the other hand, the strong solution remaining in the generator 4 is sucked into the suction pipe 21, then, cooled at the heat exchanger 14 and, at the same time, reduced in pressure at the capillary portion 15. Subsequently, the strong solution is further reduced in pressure at a capillary 22 so as to be conveyed into the absorber 1 through the pipe 23. It should be noted that, since the inlet portion 21a of the suction pipe 21 is formed with a plurality of pores, an amount of the refrigerant vapor sucked into the inlet portion 21a varies according to levels of the solution in the generator 4. Namely, in the case where the level of the solution in the generator 4 rises, the refrigerant vapor is not allowed to flow into the suction pipe 21 through the pores. On the contrary, in the case where the level of the solution in the generator 4 is lowered, the refrigerant vapor is allowed to flow into the suction pipe 21 through the pores according to the level of the solution.

Generally, since pressure drop in a two-phase flow increases in comparison with that of a single-phase flow, pressure drop increases at the capillary portion 15 such that the outflow amount of the strong solution is decreased when the refrigerant vapor is mixed with the strong solution. The absorption type heat pump device according to the present invention is designed to perform a maximum range of the outflow control of the strong solution through full utilization of the above described phenomenon. Namely, the strong solution having flowed into the capillary portion 15 is in an equilibrium state. Accordingly, when a pressure drop is larger than a temperature drop resulting from heat exchange, the strong solution is caused to boil under reduced pressure. On the contrary, when a pressure drop is smaller than a temperature drop resulting from heat exchange, the strong solution is subjected to supercooling and thus, no gas is produced. Consequently, the capillary portion 15 is so sized as to prevent boiling of the strong solution under reduced pressure in the case where an amount of the refrigerant vapor flowing into the suction pipe 21 is small, and subject the strong solution to boiling under reduced pressure in the case where a large amount of the refrigerant vapor flows into the suction pipe 21 such that pressure drop of the strong solution is increased. By the above described arrangement of the capillary portion 15, since pressure drop is greatly increased due to the boiling of the strong solution in addition to pressure drop resulting from the inflow of the refrigerant vapor into the strong solution, the outflow amount of the strong solution becomes small.

Since the strong solution sufficiently subjected to supercooling is usually required for the pipe 23 adjacent to an inlet of the absorber 1, the inner pipe of the large diameter portion 16 is made larger in diameter than that of the capillary portion 15 such that an amount of heat exchange is made larger than a pressure drop at the large diameter portion 16. Subsequently, the pressure of the strong solution is reduced to a pressure in the absorber 1 by the capillary 22 acting as a pressure reducing valve.

Table 1 shows amounts of the refrigerant vapor mixed with the strong solution in the absorption type heat pump device according to the present invention in comparison with those of the prior art absorption type heat pump device in which the pressure reducing valve is simply provided between the heat exchanger and the absorber such that the flow control of the strong solution is performed through inflow of the refrigerant vapor into the suction pipe for the strong solution as described earlier. It is to be noted that the amounts of the refrigerant vapor mixed with the strong solution are expressed in kg per 100 kg of the weak solution in Table 1.

TABLE 1

| Refrigerant Vapor (kg) | Working Condition | | | |
|---|---|---|---|---|
| | Heating Ambient Temp. = 7° C. | Cooling Ambient Temp. = 30° C. | Cooling Ambient Temp. = 35° C. | Cooling Ambient Temp. = 40° C. |
| Prior Art | 0.33 | 1.73 | 7.2 | 3.27 |
| Present Invention | 0.37 | 0.93 | 2.07 | 1.33 |

In the prior art absorption type heat pump device in Table 1, the heat exchanger is of a double pipe construction including an outer copper pipe of 15.6 mm in outside diameter and an inner copper pipe of 8 mm in outside diameter and a capillary of 3 mm in inside diameter is used as the pressure reducing valve.

On the other hand, in the absorption type heat pump device according to the present invention, the heat exchanger 14 is of a double pipe construction including the capillary portion 15 and the large diameter portion 16. The capillary portion 15 is constituted by an outer copper pipe of 15.6 mm in outside diameter and an inner copper pipe of 4 mm in inside diameter, while the large diameter portion 16 is constituted by an outer copper pipe of 15.6 mm in outside diameter and an inner copper pipe of 8 mm in outside diameter. It should be noted that R22 and an organic solvent were used as the refrigerant and the solvent, respectively in Table 1.

Furthermore, in Table 1, length of the inner pipe of the capillary portion 15 was determined such that the amount of the refrigerant vapor mixed with the strong solution in the absorption type heat pump device according to the present invention becomes almost equal to that of the prior art absorption type heat pump device at the ambient temperature of 7° C., at which ambient temperature the solution is most likely to be stored in the generator 4 during a heating operation thereof.

Table 1 shows that the amounts of the refrigerant vapor mixed with the strong solution in the absorption type heat pump device according to the present invention are reduced to a half or one-third of those of the prior art absorption type heat pump device during a cooling operation thereof. Accordingly, since the amount of the refrigerant vapor uselessly returned to the absorber 1 is made minimal in the absorption type heat pump device according to the present invention, a drop in output thereof is minimized.

Meanwhile, it may be supposed that, since a part of the refrigerant vapor generated at the generator 4 is directly returned to the absorber 1 without being fed to the condenser 6 in the heat pump device of the present invention, a coefficient of performance thereof is lowered. However, as a matter of fact, since a rate of heat exchange at the side of the strong solution is increased due to the fact that the strong solution is conveyed in the two-phase flow, latent heat of the refrigerant vapor generated at the generator 4 is completely transmitted to the weak solution and thus, heat energy of the refrigerant vapor is completely reused, whereby the coefficient of performance thereof is hardly lowered.

Figure 5:
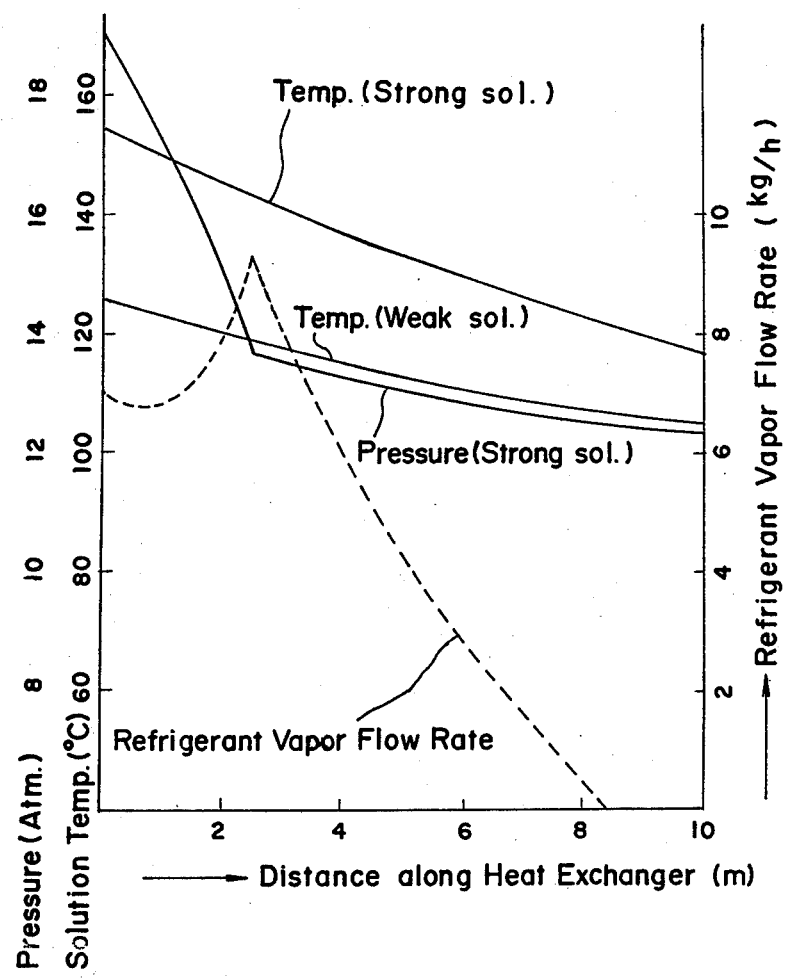
FIG. 5 is a graph explanatory of relation between temperatures and pressures of the strong solution and amounts of refrigerant vapor mixed with the strong solution.

FIG. 5 shows variations of temperatures of the weak solution and the strong solution and variations of pressures of the strong solution in the heat exchanger, and the amounts of the refrigerant vapor mixed with the strong solution. FIG. 5 clearly indicates that boiling takes place in the suction pipe for the strong solution so as to increase the amount of the refrigerant vapor in the strong solution and thus, pressure loss in the suction pipe for the strong solution is increased.

Furthermore, although the inlet portion 21a of the suction pipe 21 is formed with a plurality of pores, the inlet portion 21a can be replaced with an inlet portion 21b formed with a slit extending in an axial direction thereof or an inlet portion 21c cut off obliquely (FIG. 4(b)).

Moreover, although it is so arranged that the capillary portion 15 for lowering pressure of the strong solution of a high temperature is subjected to heat exchange with the weak solution, the same effect as described above can be obtained so as to perform the flow control of the strong solution in the case where a pressure drop in the suction pipe 21 is larger than a drop in equilibrium pressure resulting from a temperature drop in the strong solution. Consequently, the capillary portion 15 can be replaced with a capillary provided between the generator 4 and the capillary portion 15. Furthermore, it can be so arranged that the above described capillary disposed between the generator 4 and the capillary portion 15 is provided in addition to the capillary portion 15.

In addition, a double pipe construction employed in the heat exchanger of the heat pump device of the present invention can be replaced with any other suitable constructions.

As is clear from the foregoing description, although the heat pump device of the present invention controls the outflow amount of the strong solution on the basis of the amount of the refrigerant vapor generated at the generator in the same manner as in the prior art heat pump device, the heat pump device of the present invention is arranged to perform a wide range of the flow control of the strong solution in response to a small amount of the refrigerant vapor mixed with the strong solution through utilization of a secondary generation of the refrigerant vapor, which refrigerant vapor is produced upon increase of a pressure gradient resulting from mixing of the refrigerant vapor with the strong solution such that a proper pressure gradient is formed in the strong solution with respect to a temperature gradient of the strong solution, formed in the heat exchanger. Namely, as described earlier, in the prior art heat pump device, it has been so arranged that the heat exchanger is provided between the weak solution fed from the absorber to the generator and the strong solution returned from the generator to the absorber and the strong solution is maintained at a temperature lower than an equilibrium temperature corresponding to its pressure, i.e. in a supercooling state, so that the refrigerant vapor may be absorbed into the strong solution but is not newly emitted from the strong solution.

On the other hand, in the heat pump device of the present invention, since a portion for causing a large pressure loss of the strong solution is provided at the high temperature side of the suction pipe for the strong solution and in the heat exchanger, the pressure drop produced in the portion by the strong solution in the case where the refrigerant vapor is mixed with the strong solution at the time when the strong solution flows into the heat exchanger from the outlet of the generator is made larger than a drop in equilibrium pressure resulting from a temperature drop in the portion, so that the secondary generation of the refrigerant vapor is performed in the suction pipe for the strong solution and thus, the pressure loss in the suction pipe is further increased, whereby the flow rate of the strong solution is controlled to a proper value such that the solution in the generator is maintained at a predetermined level.

Accordingly, in accordance with the present invention, the flow control of the strong solution can be performed through mixing of a small amount of the refrigerant vapor with the strong solution, thus resulting in a minimal drop in output of the heat pump device.

Furthermore, in accordance with the present invention, the flow control of the strong solution can be positively performed by the heat pump device having a simplified construction, thereby resulting in substantial elimination of malfunctions thereof.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An absorption type heat pump device comprising:
   a generator for generating refrigerant vapor from weak solution having a large amount of refrigerant dissolved therein by heating the weak solution such that the weak solution is converted into strong solution having a reduced content of the refrigerant;
   a condenser for liquefying the refrigerant vapor through cooling thereof;
   an evaporator for evaporating the liquefied refrigerant through absorption of heat thereinto;
   an expansion valve for maintaining a difference in pressure between said condenser and said evaporator at a predetermined value;
   an absorber for absorbing the refrigerant vapor thereinto such that the weak solution is produced, with pressure in said absorber being maintained at a predetermined low evaporation pressure;
   a solution pump for feeding the weak solution to said generator through pressurizing of the weak solution;
   a passage member for leading the strong solution from said generator to said absorber; and
   a heat exchanger for performing heat exchange between the strong solution and the weak solution fed from said absorber to said generator by said solution pump, which is provided on said passage member so as to be interposed between said generator and said absorber;
   said heat exchanger and/or said passage member between said generator and said heat exchanger being provided with a portion in which a pressure drop is made larger than a drop in equilibrium pressure resulting from a temperature drop, whereby flow of the strong solution from said generator to said absorber is controlled through utilization of the refrigerant vapor produced due to the pressure drop in said portion.

2. An absorption type heat pump device as claimed in claim 1, wherein said portion is formed into a capillary such that said passage member between said generator and said heat exchanger is wholly or partially constituted by said capillary.

3. An absorption type heat pump device as claimed in claim 1, wherein a part of said passage member at a high temperature side in said heat exchanger is made smaller in diameter than the remaining part of said passage member in said heat exchanger, whereby said part acts as said portion.

4. An absorption type heat pump device as claimed in claim 2, wherein a part of said passage member at a high temperature side in said heat exchanger is made smaller in diameter than the remaining part of said passage member in said heat exchanger, whereby said part acts as said portion.

5. An absorption type heat pump device as claimed in claim 3, wherein said heat exchanger is of a double pipe construction including an outer pipe and an inner pipe, with said inner pipe acting as said passage member.

6. An absorption type heat pump device as claimed in claim 1, further including a suction pipe for the strong solution, said suction pipe having an inlet portion extending into the strong solution and formed with a plurality of pores.

7. An absorption type heat pump device as claimed in claim 1, further including a suction pipe for the strong solution, said suction pipe having an inlet portion extending into the strong solution and formed with a slit, with said slit extending in an axial direction of said suction pipe.

8. An absorption type heat pump device as claimed in claim 1, further including a suction pipe for the strong solution, said suction pipe having an inlet portion extending into the strong solution and cut off obliquely.

* * * * *